United States Patent Office 3,719,726
Patented Mar. 6, 1973

3,719,726
URETHANE ELASTOMER COMBINED WITH CO-POLYMER OF UNSATURATED CARBOXYLIC ACID ESTER AND IONICALLY CROSS-LINKED UNSATURATED CARBOXYLIC ACID
Kazuo Hara and Toshihiko Yoshitake, Kurashiki, Japan, assignors to Kuraray Co., Ltd., Kurashiki, Japan
No Drawing. Filed Mar. 18, 1971, Ser. No. 125,818
Claims priority, application Japan, Mar. 27, 1970, 45/26,186, 45/26,187
Int. Cl. C08g 41/04
U.S. Cl. 260—859                      22 Claims

ABSTRACT OF THE DISCLOSURE

A polymer composition comprising an intimate mixture of (1) 10 to 90 weight percent of a polyurethane elastomer in which the soft segment is polyethylene glycol or a polyethylene glycol polymer; and (2) 90 to 10 weight percent of a vinylic copolymer consisting of an $\alpha,\beta$-unsaturated carboxylic acid and an $\alpha,\beta$-unsaturated carboxylic acid ester, the carboxyl groups of said vinylic copolymer being ionically cross-linked by at least one metal of Group I, Group II or Group III of the Periodic Table. Such polymeric compositions have excellent hygroscopic, moisture permeability and mechanical properties and are suitable for manufacturing imitation leathers especially for use as shoe uppers.

---

This invention relates to novel polymeric compositions having excellent hygroscopic, moisture permeability and mechanical properties. The polymer composition of the present invention comprises an intimate mixture of (i) a polyurethane elastomer having polyethylene glycol units as the soft segment, and (ii) a vinylic copolymer of an $\alpha,\beta$-unsaturated carboxylic acid and an $\alpha,\beta$-unsaturated carboxylic acid ester, wherein said carboxyl groups of said copolymers are ionically cross-linked with at least one metal of Group I, Group II or Group III of the Periodic Table. The polymeric composition of the present invention is useful for manufacturing imitation leathers especially for use as shoe uppers.

It is well known that films or sheets suitable for use as imitation leathers, or so-called "artificial leathers," are made by wet coagulation of polyurethane elastomer solutions or emulsions. This method involves impregnating polyurethane elastomeric solutions or emulsions onto woven cloths or non-woven fabrics, or coating them onto the surfaces of base sheets, or extruding them through a die slit, and then dipping the material into a miscible non-solvent for the elastomer, such as water, lower alcohols or a mixture of such non-solvents and a solvent for said elastomer, to coagulate the impregnated, coated or extruded elastomers. These methods are described in, for example, U.S. Pat. Nos. 3,067,482; 3,100,721; 3,190,765; 3,284,274 and 3,348,963.

Polyurethane elastomers, produced by the reaction of polyalkylene ether glycols, such as polypropylene glycol or polytetramethylene ether glycol, or polyester glycols, such as polyethylene propylene adipate or polybutylene adipate, as the polymeric diol; organic diisocyanates; and aliphatic diamines, such as ethylene diamines or hydrazine, or aliphatic diols, such as ethylene glycol or butane diol-1,4-, as the chain extender, are mainly used for the production of films or sheets in the above noted patents.

These conventional imitation leathers produced from the polyurethane elastomers described above are more hydrophobic and water repellant than natural leather, and this feature is one of the important sales points for these imitation leathers. But this feature, when the imitation leathers are used for shoes or booths, adversely affects breathability and brings discomfort to the wearer.

On the other hand, it is also well known that polyurethane elastomers having polyethylene glycol units as their soft segment have excellent hygroscopic properties such as water absorption or moisture permeability, but they are too soft and have poor mechanical properties such as tensile strength or Young's modulus whereby their use as imitation leathers is precluded. In order to minimize these deficiencies, a fairly large amount of a chain extender such as ethylene glycol is used in making the hard segment of said polyurethane elastomers, and this helps to improve mechanical properties but it detracts from the original hygroscopic and moisture permeability properties of the polymer.

Accordingly, it is an object of the present invention to provide polyurethane elastomeric compositions exhibiting both improved hygroscopic and mechanical properties simultaneously.

It is another object of the present invention to provide methods of producing said novel polyurethane elastomeric compositions.

These and other objects are accomplished in accordance with the present invention by providing a polyethylene glycol based polyurethane elastomer composition containing a vinylic copolymer of an $\alpha,\beta$-unsaturated carboxylic acid and an $\alpha,\beta$-unsaturated carboxylic acid ester, wherein said carboxyl groups of said copolymer are cross-linked with at least one metal of Group I, Group II or Group III in the Periodic Table, said copolymer being intimately, compatible with the polyurethane elastomer. The resultant polymeric composition simultaneously has good hygroscopic and good mechanical properties.

The polymeric composition of the present invention comprises an intimate mixture of:

(i) From 10 to 90 weight percent of a polyurethane elastomer, from the group consisting of a polyurethane elastomer, which is produced by the reaction of (A) a polymeric diol consisting of 30 to 100 weight percent of polyethylene glycol having a molecular weight of about 200 to 10,000 and 70 to 0 weight percent of a polyester diol or another polyether diol having the molecular weight of about 200 to 10,000 and (B) an organic diisocyanate, and a polyurethane elastomer which is produced by the reaction of said polymeric diol (A) with said diisocyanate (B) and a minor amount of a chain extender; and (ii) From 90 to 10 weight percent of a vinylic copolymer consisting (C) from 5 to 80 weight percent of an $\alpha,\beta$-unsaturated carboxylic acid and (D) from 20 to 95 weight percent of an $\alpha,\beta$-carboxylic acid and (D) from 20 to 95 weight percent of an $\alpha,\beta$- unsaturated carboxylic acid ester, the carboxyl groups of said vinylic copolymer being cross-linked by at least one metal of Group I, Group II or Group III of the Periodic Table. The polyurethane elastomers, a component of the polymer composition of the present invention contain polyethylene glycol units as the soft segment, and optionally, a minor amount of a chain extender such as ethylene glycol, butane diol-1,4- or ethylene diamine, which constitute its hard segment. These polyurethane elastomers obtained by known methods of producing polyurethane elastomers by reacting polymeric diols, chain extenders and various organic diisocyanates, have only small amounts of hard segment in their molecules.

In the production of said polyurethane elastomer, the ratio of the chain extender, when a chain extender is used, to organic diisocyanate is in the range of from 0.5 to 40 weight percent and preferably from 5 to 20 percent.

The soft segment of the polyurethane elastomer consists of only polyethylene glycol, or a continuation of polyethylene glycol and other diols. As the other diols, any diol can be used, without limitation, so long as it is a diol which is used in the formation of conventional polyurethane elastomers. Examples of suitable diols are polyether diols such as polypropylene glycol, polytetramethylene glycol or polyester diols which can be obtained by the condensation of aliphatic dibasic acids, such as adipic acid and aliphatic diols such as ethylene glycol or propylene glycol. The percentage of polyethylene glycol in the soft segment desirably is from 30 to 100 weight percent, with its molecular weight being from 200 to 10,000, preferably from about 500 to 6,000.

In the polymerization reaction to form the polyurethanes, solvents which are used in the conventional polymerization of polyurethane can be used, for example, dimethylformamide, diethylformamide, dimethylacetamide, dimethylsulfoxide and tetrahydrofuran.

As the organic diisocyanate used in the present invention, one which is used in the preparation of ordinary polyurethanes can also be used herein. Examples of such diisocyanates are diphenyl methane diisocyanate (abbreviated as "MDI" hereinafter), tolylenediisocyanate, and other aromatic diisocyanates or hexamethylenediisocyanate and other aliphatic diisocyanates.

The reaction temperature for the polymerization of the polyurethane elastomer is from 0° C. to 100° C., preferably from 20° C. to 80° C. The reaction time is from about 5 minutes to sixty hours generally. The reaction is conducted usually with stirring. In the polymerization reaction, if the chain is not sufficiently extended and the viscosity of the polymerization system does not increase as desired, due to the occasional presence of impurities and moisture in the polymerization system, the organic diisocyanate can be added stepwise to the polymerization system for further reaction until the required viscosity is obtained. In other cases gelation will take place throughout reaction, and in such a case the polymerization system can be heated to from 100° C. to 150° C. to cut off the molecular chain and reduce the viscosity.

The concentration of polyurethane elastomer in the polymerization system is desirably from about 10 to 80 weight percent, and the percentage of the solvent desirable is in the range of from 20 to 90 weight percent. The polyurethane elastomer thus produced, can be used by diluting with DMF or a similar solvent to a desirable concentration.

The vinylic copolymer which is the other component of the polymer composition of the present invention consists of from 5 to 80 weight percent, preferably from 10 to 50 weight percent, of an α,β-unsaturated carboxylic acid and from 20 to 95 weight percent, preferably from 50 to 90 weight percent, of an α,β-unsaturated carboxylic acid ester.

As the α,β-unsaturated carboxylic acid used in this invention, acrylic acid, methacrylic acid and maleic acid are preferable.

As the α,β-unsaturated carboxylic acid ester used in this invention, methyl, ethyl, propyl or butyl esters of acrylic acid and methacrylic acid are preferable.

The copolymerization of both monomers usually can be conducted in the presence of a free radical polymerization catalyst by the known methods. As the catalyst, various known free radical catalysts such as benzoyl peroxide or azobis-iso-butyronitrile are usually used. The amount of the catalyst is in the range of from 0.01 to 5 weight percent based on the mixture of both monomers. The polymerization of said copolymer is desirably conducted in the presence of solvents such as aromatic hydrocarbons, for example toluene or benzene; alcohols such as methanol, ethanol or isopropanol; tetra hydrofuran or dimethylformamide.

The copolymers can be produced by emulsion copolymerization by the known methods in the presence of sodium or potassium persulfate as the catalyst. It is desirable to conduct the polymerization in an atmosphere free of oxygen as far as possible. The polymerization can be conducted at a temperature of from 0° C. to 100° C., preferably 30° C. to 90° C. The concentration of the monomers in the polymerization system is from 20 weight percent to 70 weight percent. The required time of polymerization is from about 5 minutes to 72 hours.

One of the methods of producing the present compositions is by mechanically mixing the polyurethane elastomer and the vinylic copolymer. Homogeneous mixing is obtained by mixing the polymers in the form of solutions. The mixing in the form of solutions can be effected by mixing the solution of the polyurethane elastomer obtained by solution polymerization with the solution of the vinyl copolymer as it is produced. In this case it is desirable to use the same solvent for both the materials, such as, DMF, or tetrahydrofuran, which are common solvents for both. In obtaining a mixed molding from the solutions, one can use a dry method in which the solvent is vaporized, or a wet method in which the solution is coagulated in a coagulation bath. The desirable concentration of the solution is from 5 to 80 weight percent. In other cases, both polymers can be mixed without using a solvent and molded by extrusion or injection molding or by calendering. The proportion of both polymers is desirably from 10 to 90 weight percent, preferably 30-70 wt. percent polyurethane and from 10 to 90 weight percent, preferably 30-70 wt. percent vinylic copolymer. If the polyurethane is used in too high a proportion, sufficient mechanical properties cannot be obtained, even if the mixture is subjected to cross-linking treatment; and if used in two low a proportion, sufficient hygroscopic properties cannot be obtained.

The present composition also may be produced by copolymerizing the vinylic monomers in the presence of the polyurethane elastomer.

In this method the copolymerization of the vinylic monomer mixtures is conducted by adding required amounts of both monomers and a free radical polymerization catalyst to solution of the polyurethane elastomer having polyethylene glycol unit in the soft segment.

The concentration of the polyurethane elastomer in the copolymerization system is desirably in the range of from 5 to 50 weight percent. The amount of the mixed monomers used is desirably in the range of from 10 to 900 weight parts on the basis of 100 weight parts of the polyurethane elastomer.

When vinylic monomers are copolymerized in the presence of polyurethane elastomer as above, a graft polymer is partially produced by the cografting of the vinylic monomers with the polyurethane elastomer, and the stability of the resultant solution is excellent as compared with solution obtained by merely mixing the polyurethane elastomer and the vinylic copolymer, and it is stable against phase separation. The films or moldings obtained from the above solution are more evenly dispersed and have excellent physical properties as compared to the product obtained by merely blending both polymers.

The intimate mixture produced by the methods described above is that subjected to a cross-linking reaction in the manner described below.

As the cross-linking agents to be used in the cross-linking treatment, metal compounds having reactivity with carboxyl groups may be used. For example, salts or hydroxides or alkoxides such as, formates, acetates, chlorides, bromides or sulfates, hydroxides, methoxides or ethoxides of a metal of Group I, Group II, or Group III in the periodic table such as lithium, sodium, potassium, copper, zinc, magnesium, calcium, cadmium, barium or aluminum may be used, water soluble agents being preferably used.

These cross-linking agents react with carboxyl groups and form ionic cross-linkages as represented by the following:

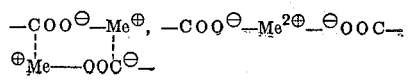

or

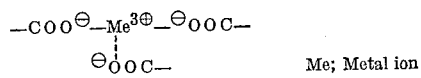

Me; Metal ion

These cross-linking agents can be added to the polymeric mixture for reaction during various steps of producing said mixture or by treating molded product, for example the film, sheet or imitation leather, with the solution of these cross-linking agents.

As the solvents for these cross-linking agents, water, methanol, ethanol, acetone, methyl acetate or various other organic solvents or mixtures of these, may be used, but water is most preferable. The cross-linking reaction is conducted at a temperature from room temperature to about 100° C. The amount of metallic ion cross-linked in the polymer composition may be controlled to be less than 10 weight percent of the total polymer composition.

Polymer compositions having excellent mechanical properties can be obtained by introducing such cross-linking in the polymer composition. The polymer composition of this invention may be used with various fillers, coloring materials, softening agents, or anti-ageing agents for the preparation of molded products.

The polymer composition as aforementioned has excellent hygroscopic properties, moisture permeability and mechanical properties unobtainable with conventional polyurethane elastomers, and can be used in a wide variety of ways for producing films, sheets, imitation leathers coating materials and other various molding products having excellent hygroscopic properties, moisture permeability and mechanical properties by the dry method, the wet coagulation method or the melt extrusion method.

For a better understanding of the present invention, the following examples in which "parts" are on a weight basis, unless otherwise specified, are presented.

EXAMPLE 1

(i) 100 parts of polyethylene glycol with a molecular weight of 2030, 77.1 parts of a polyester diol prepared from adipic acid, ethylene glycol and propylene glycol having a molecular weight of 1960 and a ratio of ethylene glycol units to propylene glycol units of 9 to 1, and 23.0 weight parts of 4.4'-diphenylmethane diisocyanate, dissolved in 600 parts of dimethylformamide are reacted at a temperature of 80° C. for 5 hours while adding an additional 10.9 parts of 4.4'-diphenylmethane diisocyanate to the solution, to produce a polyurethane elastomer.

The viscosity of the resultant polyurethane elastomeric solution attained to 120 poises at 30° C.

(ii) Separately, 12 parts of acrylic acid, 28 parts of butyl acrylate and 0.1 part of benzoyl peroxide (catalyst) are dissolved in 60 parts of dimethylformamide and then reacted at 60° C. with stirring under an atmosphere of nitrogen for 5 hours. The yield of copolymer was 97.2 percent and it had an intrinsic viscosity $[\eta]$ in acetone at 30° C. of 0.950 dl./g.

(iii) The polyurethane elastomeric solution obtained in (i) above, and the copolymer solution obtained in (ii) above, are combined in a ratio of 60 to 40 by weight.

A film 0.10 mm. thick is obtained by extruding the dimethylformamide solution through a die into a hot air atmosphere to evaporate the dimethylformamide from the extruded solution. The film is soaked in a 10 percent aqueous zinc acetate solution at room temperature to impart the cross-linked structure to the mixed polymers. The film is dried, washed with water and dried again.

The mechanical and hygroscopic properties of the resultant film are measured with the following results.

Tensile strength (kg./mm.$^2$) _____ 0.763
Elongation (percent) _____ 743
Young's modulus (kg./mm.$^2$) _____ 2.86
Water absorption (percent) _____ 62.9
Hygroscopicity at 20° C. and 90% relative humidity (percent) _____ 22.5
Moisture permeability (10μ thick) (g./m.$^2$/24 hrs.) _____ 3300

A control sample consisting of the polyurethane elastomer which is produced in (i) above alone, is softer and has very low strength. The water absorption, hygroscopicity and moisture permeability of a 0.10 mm. thick film consisting of the control polyurethane elastomer are 3%, 1.5% and 700 g./m.$^2$/24 hrs., respectively.

As apparent from the above results, the polymer composition of this invention has excellent mechanical properties and high hygroscopicity.

EXAMPLE 2

A vinylic copolymer having carboxylic groups was produced by the copolymerization of 8 parts of acrylic acid and 32 parts of butyl acrylate dissolved in 60 parts of dimethylformamide, in the presence of 0.1 part of benzoyl peroxide under an atmosphere of nitrogen and at a temperature of 60° C. for 8 hours. The yield was 99.8% of reaction product with an intrinsic viscosity $[\eta]$ in acetone solution at 30° C. of 1.060 dl./g.

The dimethylformamide solution of the polyurethane elastomer obtained in Example 1 and the dimethylformamide solution of the vinylic copolymer obtained above were mixed in a ratio of polyurethane elastomer to vinylic copolymer of 60:40. The mixed polymer solution was cast onto a glass plate at a temperature of 80° C. to produce a film 0.10 mm. thick. The film was soaked in a 10% aqueous zinc acetate solution at room temperature to introduce the ionic cross-linkage into the polymer composition. The resultant film was then dried, washed with water and dried again.

From a solution having the same composition, a film 0.01 mm. thick was produced, and after the same treatment the moisture permeability was measured, with the following results:

Tensile strength (kg./mm.$^2$) _____ 0.533
Tensile elongation (percent) _____ 821
Young's modulus (kg./mm.$^2$) _____ 2.46
Water absorption (percent) _____ 66.1
Hygroscopicity (20° C., 90% RH) (percent) ___ 25.6
Moisture permeability (10μ thick) (g./m.$^2$/24 hr.) _____ 3,400

As compared with the conventional polyurethane elastomer, it was found that this polyurethane composition was highly hydrophilic. The dimethylformamide solutions of the polyurethane elastomer and the vinylic copolymer were mixed in a ratio of 40:60, and formed into a film, 0.10 mm. thick by the dry method, and after the same treatment as above the performances of the film was measured with the following results:

Tensile strength (kg./mm.$^2$) _____ 0.749
Tensile elongation (percent) _____ 379
Young's modulus (kg./mm.$^2$) _____ 4.77
Water absorption (percent) _____ 49.4
Hygroscopicity (20° C., 90% RH) (percent) ___ 21.8

From the above mixed solution was prepared a film 0.01 mm. thick by the dry method and the film was subjected to cross-linking treatment. Its moisture permeability was 3000 g./m.$^2$/24 hr. As compared with the conventional polyurethane elastomer, this polyurethane composition had excellent hydrophilic properties.

The tensile strength, tensile elongation and Young's modulus of the film which was not cross-linked were 0.205 kg./mm.$^2$, 1350% and 0.148 kg./mm.$^2$ respectively, thus showing that the cross-linking treatment effects considerable improvement in the mechanical properties of the film.

EXAMPLE 3

A polyurethane elastomer was prepared from the following reagents:

Parts
Polyethylene glycol (molecular weight: 1914) ____ 177
Ethylene glycol (chain extender) _____ 3.1
MDI _____ 24.0
DMF (solvent) _____ 600

The DMF solution of the reactants was reacted at 80° C. for 10 hours. The polyurethane solution thus obtained had a viscosity of 74.2 poise at 30° C. This polyurethane elastomer and the vinylic copolymer obtained in Example 2 were mixed in a ratio of 60:40, and the resultant dimethylformamide solution was formed into films 0.10 mm. thick and 0.01 mm. thick respectively, and these films were cross-linked in the same manner as in Example 1 with the following results:

Tensile strength (kg./mm.$^2$) _____ 0.455
Tensile elongation (percent) _____ 810
Young's modulus (kg./mm.$^2$) _____ 1.66
Water absorption (percent) _____ 90.6
Hygroscopicity (20° C., 90% RH) (percent) ____ 26.3
Moisture permeability (10$\mu$ thick) (g./m.$^2$/24 hr.) _____ 3,800

As is apparent from the above results the above polyurethane composition had excellent hydrophilic properties.

EXAMPLE 4

A polyurethane elastomer was prepared from the following reactants:

| | Parts |
|---|---|
| Polyethylene glycol (molecular weight: 4080) | 100 |
| Polypropylene glycol (molecular weight: 2100) | 22.4 |
| MDI | 10.5 |
| DMF (solvent) | 600 |

The reaction was conducted at 80° C. for 10 hours. The viscosity of the resultant polyurethane solution at 30° C. was 83 poise.

A vinylic copolymer having a carboxyl group was produced from the following reagents:

| | Parts |
|---|---|
| Methacrylic acid | 12 |
| Methyl methacrylate | 28 |
| Benzoyl peroxide (catalyst) | 0.1 |
| DMF (solvent) | 60 |
| Reaction temperature, 60° C. | |

The resultant vinylic copolymer, at 30° C., had a viscosity of 55.8 poise.

A dimethylformamide solution of the polyurethane elastomer and the vinyl copolymer in a polymer ratio of 50:50 was prepared, and the solution was formed by the dry method into films 0.10 mm. and 0.01 mm. thick. The films were soaked in a 20% aqueous solution of zinc formate, thereby introducing ionic cross-linking, then dried, washed with water and dried again for measurement of the performances thereof. The results were as follows:

Tensile strength (kg./mm.$^2$) _____ 0.826
Tensile elongation (percent) _____ 230
Young's modulus (kg./mm.$^2$) _____ 5.10
Water absorption (percent) _____ 62.3
Hygroscopicity (20° C., 90% RH) (percent) ____ 23.5
Moisture permeability (10$\mu$ thick) (g./m.$^2$/24 hrs.) _____ 3,100

A dimethylformamide solution of the polyurethane elastomer obtained in Example 1 and the vinylic copolymer in the ratio of 50:50 was prepared, and formed by the dry method into films 0.10 mm. and 0.01 mm. thick, respectively. These films were soaked in a 5% aqueous solution of calcium hydroxide thereby introducing ionic cross-linking, then dried, washed with water and dried again with the following results:

Tensile strength (kg./mm.$^2$) _____ 0.915
Tensile elongation (percent) _____ 320
Young's modulus (kg./mm.$^2$) _____ 4.65
Water absorption (percent) _____ 65.0
Hygroscopicity (20° C., 90% RH) (percent) ____ 24.4
Moisture permeability (10$\mu$ thick) (g./m.$^2$/24 hrs.) _____ 3,350

As apparent from the above results, all the compositions were highly hydrophilic.

EXAMPLES 5–14

A film of this invention, which is produced by the method of Example 1 is soaked in various aqueous solutions of the following cross-linking agents instead of zinc acetate, respectively.

After drying, the mechanical properties and hygroscopic properties of these films are measured and the results given in Table I.

TABLE I

| Example No. | Cross-linking agent | Concentration in aqueous solution, percent | Tensile strength (kg./mm.$^2$) | Elongation, percent | Young's modulus (kg./mm.$^2$) | Water absorption, percent | Hygroscopicity (20° C. 90% RH), percent | Moisture permeability (10$\mu$ thick) (g./m.$^2$/24 hrs.) |
|---|---|---|---|---|---|---|---|---|
| 5 | NaOH | 10 | 0.481 | 965 | 1.94 | 78.2 | 24.5 | 3,700 |
| 6 | LiOH | 10 | 0.461 | 950 | 2.00 | 70.5 | 22.0 | 3,700 |
| 7 | NaOCOCH$_3$ | 10 | 0.524 | 780 | 2.35 | 66.5 | 21.7 | 3,550 |
| 8 | Mg(OCOCH$_3$)$_2$ | 10 | 0.705 | 532 | 2.80 | 64.0 | 21.5 | 3,250 |
| 9 | Ca(OCOCH$_3$)$_2$ | 10 | 0.755 | 720 | 2.65 | 63.5 | 21.0 | 3,200 |
| 10 | CdSO$_4$ | 10 | 0.743 | 680 | 2.45 | 62.7 | 22.0 | 3,000 |
| 11 | Ba(OCOCH$_3$)$_2$ | 10 | 0.736 | 650 | 2.15 | 63.0 | 21.5 | 3,050 |
| 12 | Al(OCOCH$_3$)$_3$ | 5 | 0.925 | 560 | 3.10 | 62.3 | 20.0 | 2,700 |
| 13 | Al$_2$(SO$_4$)$_3$ | 5 | 0.863 | 576 | 2.90 | 62.0 | 20.8 | 2,900 |
| 14 | Al(OC$_2$H$_5$)$_3$ | 5 | 0.846 | 535 | 2.75 | 61.8 | 21.2 | 3,000 |

It is apparent from these results that the polymer compositions of this invention have excellent hygroscopic and mechanical properties making them suitable for use as shoe uppers.

EXAMPLE 15

A polyurethane elastomer was produced from the following reactants:

| | Parts |
|---|---|
| Polyethylene glycol (M.W. 2030) | 100 |
| Adipic polyester used in Example 1 (M.W. 1960) | 77.1 |
| MDI (added initially) | 23.1 |
| MDI (added during reaction) | 6.6 |
| DMF (solvent) | 600 |
| Reaction temperature, 80° C. | |

The solution of the polyurethane elastomer obtained after 12 hours reaction had a viscosity of 31.5 poise at 30° C.

The following vinylic monomers were copolymerized in the presence of the above polyurethane elastomer:

| | Parts |
|---|---|
| DMF solution of polyurethane elastomer | 100 |
| Acrylic acid | 5 |
| Butyl acrylate | 12 |
| Benzoyl peroxide | 0.2 |

The reaction was carried out at 60° C. with stirring in a nitrogen atmosphere for 15 hours and the viscosity of the resultant solution was 54.6 poise, measured at 30° C.

The polymer solution obtained above contained a graft polymer, and had higher transparency and stability than the simple mixture of both polymers. The composition consists of a mixture in the ratio of 60% of the polyurethane elastomer and 40% of the vinylic copolymer, 11.9% acrylic acid being present in the total polymer.

From the above solution were produced films 0.10 mm. thick and 0.01 mm. thick, which were soaked in a 10% aqueous solution of zinc acetate at room temperature, whereby cross-linking was introduced, thereafter dried, washed with water and dried. By measuring the performances thereof the following results were obtained:

| | |
|---|---|
| Tensile strength (kg./mm.$^2$) | 0.865 |
| Tensile elongation (percent) | 650 |
| Young's modulus (kg./mm.$^2$) | 2.32 |
| Water absorption (percent) | 65.0 |
| Hygroscopicity (20° C., 90% RH) (percent) | 25.5 |
| Moisture permeability (10$\mu$ thick) (g./m.$^2$/24 hrs.) | 3,550 |

The film produced by the dry method from the above polyurethane elastomer alone was extremely soft and very poor in strength. The water absorption, hygroscopicity and moisture permeability of the film 0.01 mm. thick made from the polyurethane elastomer (polyethylene propylene adipate diol—molecular weight 1960) as the soft segment were measured and found to be 3%, 1.5% and 700 g./m.$^2$/24 hrs., respectively.

As is apparent from the above results, the polymer composition of this invention has excellent mechanical properties and is highly hydrophilic.

EXAMPLE 16

A vinylic copolymer having carboxylic groups was prepared from the following reactants in a dimethylformamide solution of the polyurethane elastomer obtained in Example 16:

| | |
|---|---|
| DMF solution of polyurethane of Example 15 | 100 |
| Acrylic acid | 11.2 |
| Butyl acrylate | 16.8 |
| Benzoyl peroxide | 0.2 |
| DMF (solvent) | 42 |

The mixture was reacted at 60° C. with stirring in a nitrogen atmosphere for 14 hours. The resultant polymer solution (a) contains a minor amount of a graft polymer. This solution has excellent stability and remains homogeneous and transparent for a long period.

The composition of this solution is 53% polyurethane elastomer and 47% vinylic copolymer, 26.7% of the acrylic acid component being present in the total polymer.

Separately, vinylic monomers were polymerized in the following reaction mixture:

| | Parts |
|---|---|
| Acrylic acid | 11.2 |
| Butyl acrylate | 16.8 |
| Benzoyl peroxide | 0.2 |
| DMF (solvent) | 42 |

The mixture was reacted at 60° C. with stirring in the nitrogen atmosphere for 10 hours giving a vinyl is copolymer.

A mixed polymer solution (b) was obtained by mixing 100 parts of the solution of polyurethane elastomer obtained in Example 15 and 70 parts of this vinylic copolymer. While solution (a) contained a graft polymer, solution (b) contained no graft polymer, but the polyurethane and acrylic acid copolymer components were present in the same proportions.

Films 0.10 mm. and 0.01 mm. thick were prepared from these two solutions, respectively. The films were soaked in a 10% aqueous solution of zinc acetae at room temperature to cross-link the carboxylic groups, then dried, washed with water and dried. Measurement of properties gave the following results:

| | (a) | (b) |
|---|---|---|
| Transparency of film | Transparent | Translucent |
| Tensile strength (kg./mm.$^2$) | 1.10 | 0.730 |
| Tensile elongation, percent | 500 | 680 |
| Young's modulus (kg./mm.$^2$) | 2.5 | 1.30 |
| Water absorption, percent | 63.5 | 55.0 |
| Hygroscopicity (20° C., 90% RH), percent | 27.0 | 23.6 |
| Moisture permeability (10$\mu$ thick) (g./m.$^2$/24 hrs.) | 4,000 | 3,800 |

It is apparent from the above that these films excel over ordinary polyurethanes in hydrophilic properties.

The film produced from solution (a) containing the graft polymer is an excellent disperison of both components and excels in transparency as compared with the film produced from solution (b) which is a merely blended product, and it has excellent mechanical and moisture permeability properties.

EXAMPLE 17

A polyurethane elastomer was produced from the following reactants:

| | Parts |
|---|---|
| Polyethylene glycol (molecular weight of 1914) | 177 |
| Ethylene glycol (chain extender) | 3.1 |
| MDI | 24.0 |
| DMF (solvent) | 600 |

The mixture was reacted at 80° C. for 10 hours and the resultant polyurethane elastomer solution had a viscosity of 34.5 poise at 30° C.

A vinylic copolymer having carboxyl groups was produced, in the presence of the above polyurethane elastomer, from a DMF solution of the following composition:

| | Parts |
|---|---|
| DMF solution of above polyurethane elastomer | 100 |
| Acrylic acid | 5.0 |
| Butyl acrylate | 12.0 |
| Benzoyl peroxide | 0.2 |

The mixture was reacted at 80° C. for 8 hours, and the resultant mixed polymer solution had a viscosity of 74.8 poise at 30° C. The transparency and stability of the solution were excellent as it contained graft polymer. This mixed polymer contained 60% polyurethane and 40% acrylic acid copolymer components. Films 0.10 mm. and 0.01 mm. thick, prepared from the solution, were soaked in 5% aqueous calcium hydroxide solution for cross-linking, then dried, washed with water and dried again. The films had the following properties:

| | Not cross-linked | Cross-linked |
|---|---|---|
| Tensile strength (kg./mm.$^2$) | 0.130 | 0.520 |
| Tensile elongation, percent | 1540 | 770 |
| Young's modulus (kg./mm.$^2$) | 0.243 | 1.90 |
| Water absorption, percent | 95.0 | 93.5 |
| Hygroscopicity (20° C., 90% RH), percent | 30.5 | 28.8 |
| Moisture permeability (10$\mu$ thick) (g./m.$^2$/24 hrs.) | 3,850 | 3,800 |

As is evident from the above results, the polyurethane compositions prepared by the above methods exhibited excellent hydrophilic properties. By cross-linking, mechanical strength was improved without loss of hydrophilic properties.

EXAMPLE 18

A dimethylformamide solution of polyurethane elastomer was produced from a solution of the following reactants:

| | Parts |
|---|---|
| Polyethylene glycol (M.W. 4080) | 100 |
| Polytetramethylene adipate diol (M.W. 2100) | 2.24 |
| MDI | 10.5 |
| DMF (solvent) | 500 |

The above mixture was reacted at 80° C. for 10 hours, and the resultant polyurethane elastomeric solution had a viscosity of 27.5 poise at 30° C.

A vinylic copolymer having a carboxyl group was copolymerized from the following monomers in the presence of the polyurethane elastomeric solution described above:

| | Parts |
|---|---|
| DMF solution of the above polyurethane elastomer | 100 |
| Methacrylic acid | 3.6 |
| Methyl methacrylate | 8.4 |
| Benzoyl peroxide | 0.2 |

The above mixture was reacted at 80° C. for 10 hours, and the viscosity of the resultant mixed polymer solution at 30° C. was 35 poise. The solution containing graft polymer showed excellent transparency and stability. The mixed polymer contained 60% polyurethane and 40% vinylic copolymer components. Films 0.10 mm. and 0.01 mm. thick, respectively, made from the solution, were soaked in a 10% aqueous solution of zinc formate for cross-linking, then dried, washed with water and dried again. Measurement of the performances thereof gave the following results:

| | |
|---|---|
| Tensile strength (kg./mm.$^2$) | 0.623 |
| Tensile elongation (percent) | 340 |
| Young's modulus (kg./mm.$^2$) | 3.78 |
| Water absorption (percent) | 70.0 |
| Hygroscopicity (20° C., 90% RH) | 26.4 |
| Moisture permeability (10$\mu$ thick) (g./m.$^2$/24 hrs.) | 3,300 |

As apparent from the above results, this polyurethane composition has excellent mechanical and hydrophilic properties.

EXAMPLE 19

50 g. of the polymer composition obtained by the method of Example 15 is milled in a rubber-mill at a temperature of 100 to 120° C. to obtain an intimate mixture. 20 ml. of an ethanol solution of 3 g. of sodium methoxide is added gradually into said mixture as the cross-linking agent.

After milling an additional 10 minutes, a transparent elastic polymer is obtained. This polymer composition is molten and extruded from the die to make a film 20$\mu$ thick. The moisture permeability of this film is more than twice as much as that of the film made from polyurethane having the polyethylene propylene glycol adipate as the soft segment.

The procedure of this example was repeated using aqueous solutions of calcium acetate, aluminum sulfate, zinc acetate and caustic soda instead of an ethanol solution of sodium methoxide as cross-linking agents and the same results were obtained.

What is claimed is:

1. A polymer composition comprising an intimate mixture of:
   (i) from 10 to 90 weight percent of a member selected from the group consisting of a polyurethane elastomer which is produced by the reaction of (A) a polymeric diol consisting of 30 to 100 weight percent of polyethylene glycol having a molecular weight of about 200 to 10,000 and 70 to 0 weight percent of a polyester diol or another polyether diol having a molecular weight of about 200 to 10,000 and (B) an organic diisocyanate; and a polyurethane elastomer which is produced by reaction of said (A) and (B) with a minor amount of a chain extender; and
   (ii) from 90 to 10 weight percent of a vinylic copolymer consisting of (C) from 5 to 80 weight percent of an $\alpha,\beta$-unsaturated carboxylic acid and (D) from 20 to 95 weight percent of an $\alpha,\beta$-unsaturated carboxylic acid ester, the carboxyl groups of said vinylic copolymer being ionicly cross-linked by at least one metal of Group I, Group II or Group III of the periodic table.

2. A polymer composition according to claim 1 wherein said $\alpha,\beta$-unsaturated carboxylic acid is acrylic acid.

3. A polymer composition according to claim 1 wherein said $\alpha,\beta$-unsaturated carboxylic acid is methacrylic acid.

4. A polymer composition according to claim 1 wherein said $\alpha,\beta$-unsaturated carboxylic acid ester is methyl methacrylate.

5. A polymer composition according to claim 1 wherein said $\alpha,\beta$-unsaturated carboxylic acid ester is butyl acrylate.

6. A polymer composition according to claim 1 wherein said metal is zinc.

7. A polymer composition according to claim 1 wherein said metal is sodium.

8. A polymer composition according to claim 1 wherein said metal is calcium.

9. A polymer composition according to claim 1 wherein said metal is cadmium.

10. A polymer composition according to claim 1 wherein said metal is aluminum.

11. A method of producing a polymer composition comprising the steps of
    (1) mechanically mixing
        (i) from 10 to 90 weight percent of a member selected from the group consisting of a polyurethane elastomer which is produced by the reaction of (A) a polymeric diol consisting of 30 to 100 weight percent of polyethylene glycol having a molecular weight of about 200 to 10,000 and 70 to 0 weight percent of a polyester diol or another polyether diol having a molecular weight of about 200 to 10,000 and (B) an organic diisocyanate; and a polyurethane elastomer which is produced by the reaction of said (A) and (B) with a minor amount of chain extender,
        (ii) and from 90 to 10 weight percent of vinylic copolymer consisting of (C) from 5 to 80 weight percent of an $\alpha,\beta$-unsaturated carboxylic acid and (D) from 20 to 95 weight percent of an $\alpha,\beta$-unsaturated carboxylic acid ester to produce an intimate mixture; and
    (2) introducing ionic cross-linkages into said copolymer by reacting said mixture with a salt, hydroxide or alkoxide of a metal of Group I, Group II or Group III of the periodic table to produce a polymer composition having excellent hygroscopic moisture permeability and mechanical properties.

12. A method of producing a polymer composition comprising the steps of
    (1) mechanically mixing
        (i) from 10 to 90 weight percent of a member selected from the group consisting of a polyurethane elastomer, which is produced by the reaction of (A) a polymeric diol consisting of 30 to 100 weight percent of polyethylene glycol having a molecular weight of about 200 to 10,000 and 70 to 0 weight percent of a polyester diol or another polyether diol having a molecular weight of about 200 to 10,000 and (B) an organic diisocyanate; and the polyurethane elastomer which is produced by the reaction of said (A) and (B) with a minor amount of a chain extender; and
        (ii) from 90 to 10 weight percent of a monomeric mixture consisting of (C) 5 to 80 weight percent of an $\alpha,\beta$-unsaturated carboxylic acid and (D) 95 to 20 weight percent of a $\alpha,\beta$-unsaturated carboxylic acid ester,
    (2) copolymerizing said monomeric mixture in the presence of said polyurethane elastomer to produce an intimate mixture of said polyurethane elastomer and the resultant vinylic copolymer; and
    (3) introducing ionic cross-linkages into said mixture by reacting said mixture with salts, hydroxides or alkoxides of metals of Group I, Group II or Group III of the periodic table to produce a polymer composition having excellent hygroscopic moisture permeability and mechanical properties.

13. A water-insoluble film, comprising the polymer composition of claim 1.

14. A water-insoluble film, comprising the polymer composition of claim 2.

15. A water-insoluble film, comprising the polymer composition of claim 3.

16. A water-insoluble film, comprising the polymer composition of claim 4.

17. A water-insoluble film, comprising the polymer composition of claim 5.

18. A water-insoluble film, comprising the polymer composition of claim 6.
19. A water-insoluble film, comprising the polymer composition of claim 7.
20. A water-insoluble film, comprising the polymer composition of claim 8.
21. A water-insoluble film, comprising the polymer composition of claim 9.
22. A water-insoluble film, comprising the polymer composition of claim 10.

References Cited
UNITED STATES PATENTS

| | | | |
|---|---|---|---|
| 3,441,635 | 4/1969 | Lowell | 260—859 |
| 3,271,342 | 9/1966 | Kuhn | 260—859 |
| 3,427,192 | 2/1969 | Bolinger | 260—859 |
| 3,360,494 | 12/1967 | Bolinger | 260—859 |
| 3,426,099 | 2/1969 | Freifeld | 260—859 |
| 3,491,050 | 1/1970 | Keberle | 260—859 |
| 3,491,051 | 1/1970 | Elkin | 260—859 |
| 3,617,361 | 11/1971 | Reinhard | 260—859 |

PAUL LIEBERMAN, Primary Examiner

U.S. Cl. X.R.

260—77.5 CR

PO-1050
(5/69)

UNITED STATES PATENT OFFICE
CERTIFICATE OF CORRECTION

Patent No. 3,719,726      Dated March 6, 1973

Inventor(s) Kazuo Hara et al

It is certified that error appears in the above-identified patent and that said Letters Patent are hereby corrected as shown below:

Column 2, line 1, "booths" should be --boots--.

Column 2, line 49, delete "(D) from 20 to 95 weight percent of an $\alpha,\beta$-carboxylic acid and".

Signed and sealed this 7th day of May 1974.

(SEAL)
Attest:

EDWARD M. FLETCHER, JR.
Attesting Officer

C. MARSHALL DANN
Commissioner of Patents